United States Patent
Zhang et al.

(10) Patent No.: US 8,591,381 B2
(45) Date of Patent: Nov. 26, 2013

(54) SYSTEM AND METHOD FOR CONTROLLING AN AUTOMATIC ENGINE RESTART

(75) Inventors: Zhen J. Zhang, Canton, MI (US); Casie M. Bockenstette, Clarkston, MI (US); Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 115 days.

(21) Appl. No.: 13/228,664

(22) Filed: Sep. 9, 2011

(65) Prior Publication Data

US 2012/0088632 A1 Apr. 12, 2012

Related U.S. Application Data

(60) Provisional application No. 61/392,161, filed on Oct. 12, 2010.

(51) Int. Cl.
*F16H 61/00* (2006.01)

(52) U.S. Cl.
USPC .......................................................... 477/150

(58) Field of Classification Search
USPC ........... 477/52, 115, 121, 150, 151, 125, 156, 477/162; 701/51, 54
See application file for complete search history.

(56) References Cited

U.S. PATENT DOCUMENTS

| | | | |
|---|---|---|---|
| 2003/0022757 A1* | 1/2003 | Shimabukuro et al. | 477/115 |
| 2003/0109970 A1* | 6/2003 | Nakamori et al. | 701/22 |
| 2003/0171867 A1* | 9/2003 | Nakamori et al. | 701/54 |
| 2010/0216594 A1* | 8/2010 | Hendrickson et al. | 477/19 |
| 2010/0228452 A1* | 9/2010 | Hosoya et al. | 701/51 |
| 2010/0311538 A1* | 12/2010 | Miyabe et al. | 477/2 |
| 2011/0011074 A1* | 1/2011 | Mellet et al. | 60/329 |
| 2011/0077124 A1* | 3/2011 | Moorman et al. | 477/152 |
| 2012/0088631 A1* | 4/2012 | Zhang et al. | 477/52 |

* cited by examiner

*Primary Examiner* — Justin Holmes

(57) ABSTRACT

A system and method for controlling automatic stop-start of a motor vehicle is provided. The system and method is configured to enable an automatic stop-start mode of operation that minimizes clutch fill during engine restart.

15 Claims, 3 Drawing Sheets

SYSTEM AND METHOD FOR CONTROLLING AN AUTOMATIC ENGINE RESTART

CROSS-REFERENCE

This application claims the benefit of U.S. Provisional Application No. 61/392,161, filed Oct. 12, 2010. The entire contents of the above application are incorporated herein by reference.

FIELD

The present disclosure relates to a system and method for controlling an automatic engine restart, and more particularly to a system and method for controlling an automatic engine restart that minimizes how many torque transmitting mechanisms are filled with hydraulic fluid.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle.

Therefore, there is a need in the art for a system and method for controlling automatic engine restarts based on motor vehicle operating conditions as well as providing controllability of the motor vehicle during engine restart.

SUMMARY

A system and method for controlling automatic restart of a motor vehicle is provided. The system and method is configured to enable an automatic restart that allows a minimum number of torque transmitting devices to fill with hydraulic fluid.

In one example, the system and method uses a position of an accelerator pedal to determine whether a single clutch is filled. In another example, the system and method uses a position of an accelerator pedal to determine whether a minimum number of clutches are filled.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
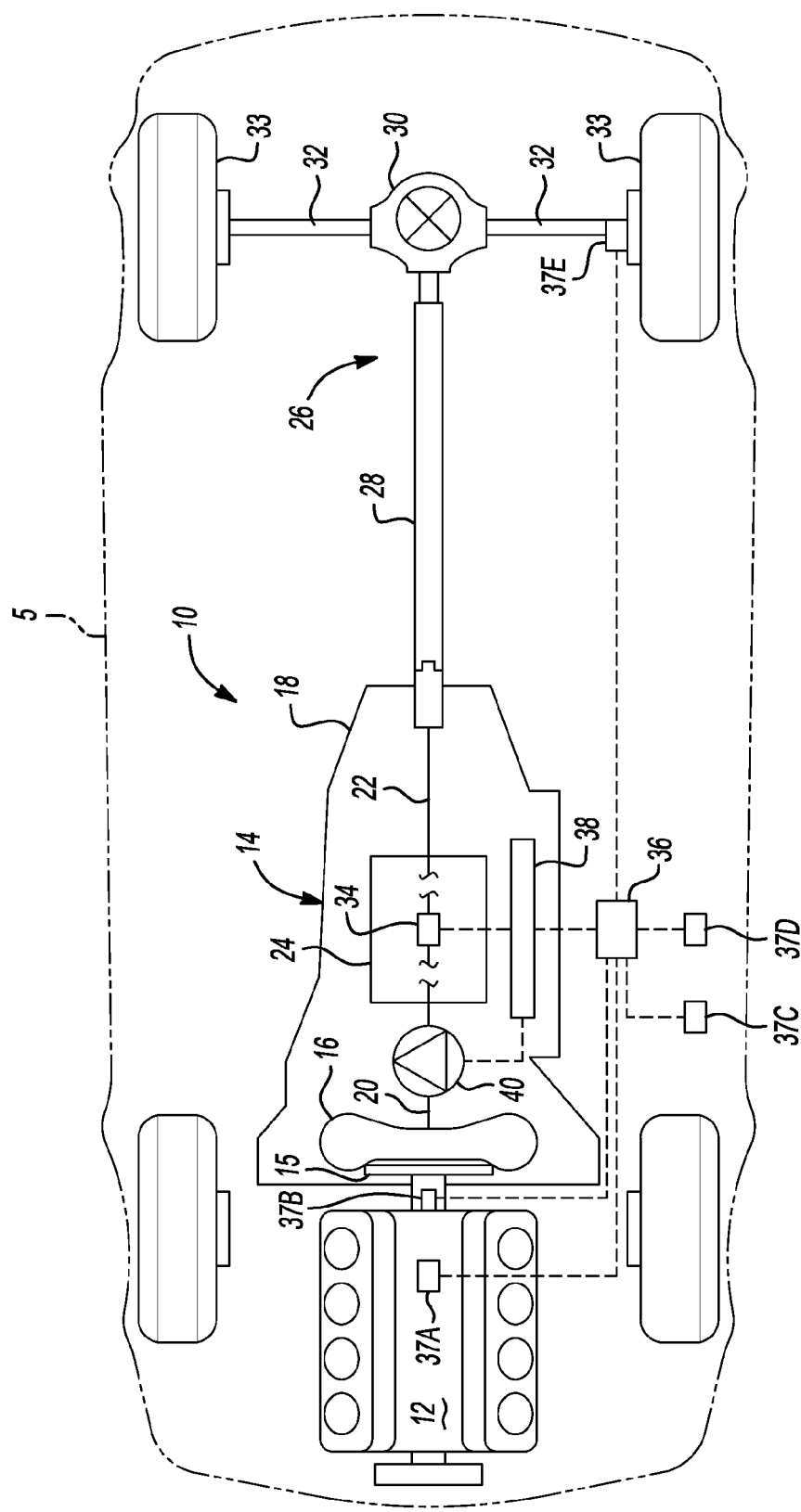
FIG. 1 is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control module 36. The control module 36 may be a transmission control module, an engine control module, or both, or any other type of controller. The control module 36 is preferably an electronic control device having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, an accelerator pedal position sensor 37C, an ignition key sensor 37D, a vehicle speed sensor 37E, to name but a few.

Figure 2:
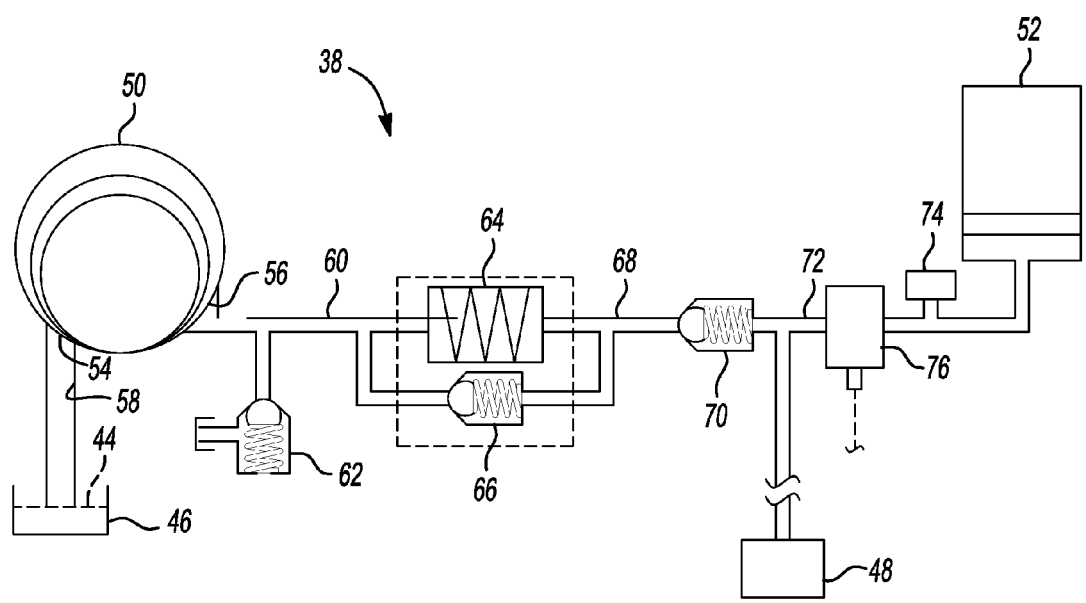
FIG. 2 is a schematic diagram of a portion of an exemplary hydraulic control system.

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 by selectively communicating a hydraulic fluid 44 from a sump 46 to a plurality of shift actuating devices 48. The hydraulic fluid 44 is communicated to the shift actuating devices 48 under pressure from either an engine driven pump 50 or an accumulator 52.

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a supply line 60. The supply line 60 is in communication with a spring biased blow-off safety valve 62, an optional pressure side filter 64, and an optional spring biased check valve 66. The spring biased blow-off safety valve 62 communicates with the sump 46. The spring biased blow-off safety valve 62 is set at a relatively high predetermined pressure and if the pressure of the hydraulic fluid 44 in the supply line 60 exceeds this pressure, the safety valve 62 opens momentarily to relieve and reduce the pressure of the hydraulic fluid 44. The pressure side filter 64 is disposed in parallel with the spring biased check valve 66. If the pressure side filter 64 becomes blocked or partially blocked, pressure within supply line 60 increases and opens the spring biased check valve 66 in order to allow the hydraulic fluid 44 to bypass the pressure side filter 64.

The pressure side filter 64 and the spring biased check valve 66 each communicate with an outlet line 68. The outlet line 68 is in communication with a second check valve 70. The second check valve 70 is in communication with a main supply line 72 and is configured to maintain hydraulic pressure within the main supply line 72. The main supply line 72 supplies pressurized hydraulic fluid to a control device 76. The control device 76 is electrically controlled by the control module 36 and is operable to control whether the accumulator 52 is charged or discharged. When the control device 76 is open, the accumulator 52 may discharge. When the control device 76 is closed, the accumulator 52 may charge and remain charged. The control device 76 may be an on/off solenoid or a pressure or flow control solenoid.

The main supply line 72 communicates through a hydraulic circuit that may include other control devices, valves, etc., to the plurality of actuating devices 48. The actuating devices 48 may be, for example, piston assemblies that when engaged in turn engage the clutches/brakes 34.

The control device 76 communicates with the accumulator 52 and a pressure sensor 74. The accumulator 52 is an energy storage device in which the non-compressible hydraulic fluid 44 is held under pressure by an external source. In the example provided, the accumulator 52 is a spring type or gas filled type accumulator having a spring or compressible gas that provides a compressive force on the hydraulic fluid 44 within the accumulator 52. However, it should be appreciated that the accumulator 52 may be of other types, such as a gas-charged type, without departing from the scope of the present invention. Accordingly, the accumulator 52 is operable to supply pressurized hydraulic fluid 44 back to the main supply line 72. However, upon discharge of the accumulator 52, the second check valve 70 prevents the pressurized hydraulic fluid 44 from returning to the pump 50. The accumulator 52, when charged, effectively replaces the pump 50 as the source of pressurized hydraulic fluid 44, thereby eliminating the need for the pump 50 to run continuously. The pressure sensor 74 reads the pressure of the hydraulic fluid 44 within the main supply line 72 or the accumulator 52 in real time and provides this data to the control module 36. Other types of sensors, such as volume or position sensors, may also be included.

Figure 3:
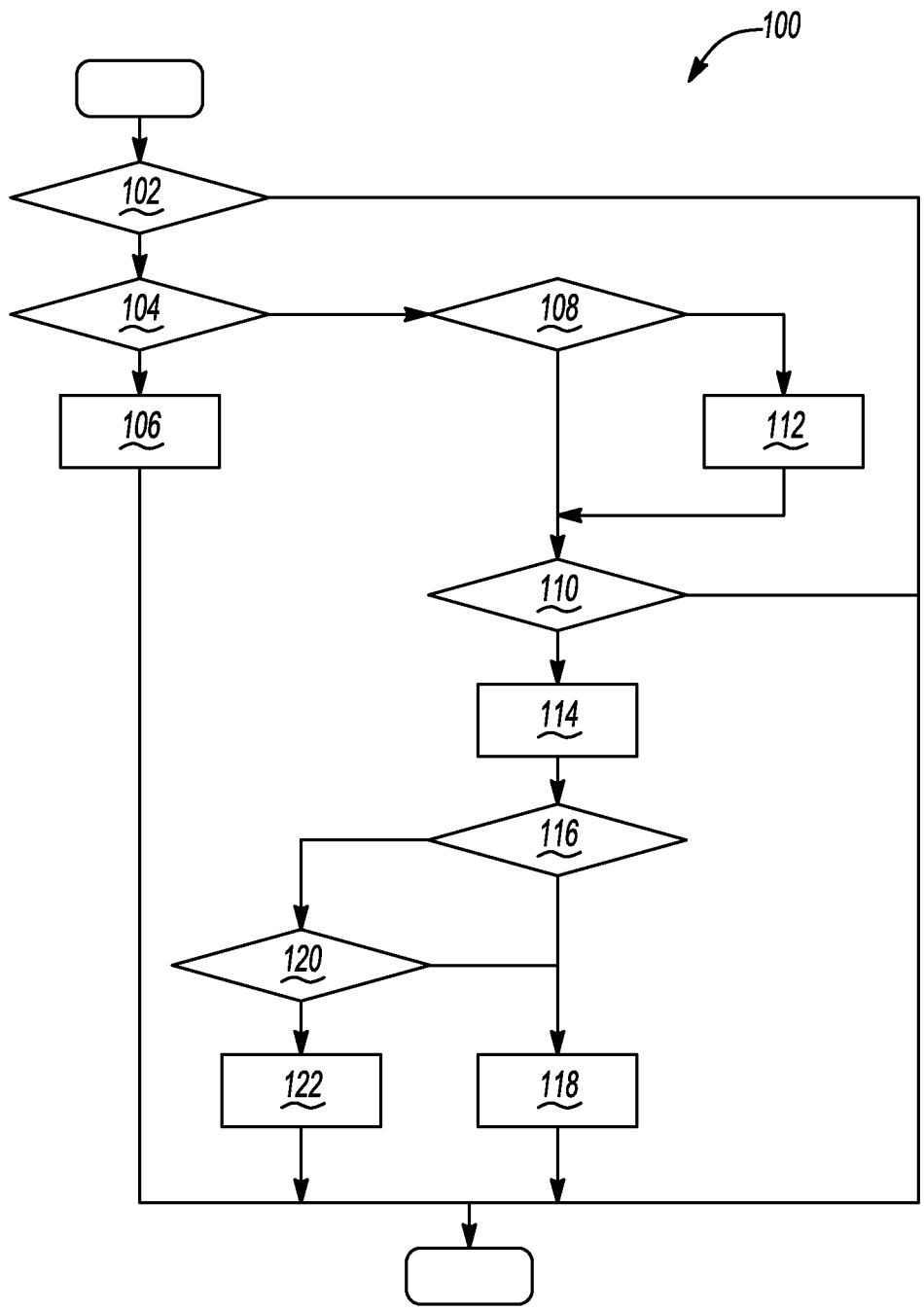
FIG. 3 is a flow chart illustrating a method of operating the motor vehicle of FIGS. 1-2 according to the principles of the present invention.

With reference to FIG. 3, and with continued reference to FIGS. 1 and 2, a method 100 for operating the motor vehicle 5 will now be described. The method 100 is configured to override a commanded shift during an automatic engine stop and at the beginning of an automatic engine restart such that a minimum number of torque transferring devices (clutches, brakes, free wheelers, etc.) is primed during restart. For example, the method 100 begins at step 102 where the control module 36 determines whether the accumulator 52 is being used and whether the transmission 14 is in a forward drive state. If the transmission 14 is not using the accumulator 52 or the transmission is not in a forward drive state, the method 100 ends. If the transmission 14 is using the accumulator 52 and the transmission is in a forward drive state, the method 100 proceeds to step 104 where the control module 36 determines whether the motor vehicle 5 is currently in an automatic engine stop condition. If the engine 12 is in an automatic stop mode the method proceeds to step 106. At step 106, the commanded shift is overridden such that a minimum number of the clutches 34 required for a first forward gear will be engaged during the automatic engine restart and the method 100 ends.

If the engine 12 is not in an automatic stop mode, i.e. the engine 12 has begun to restart after an automatic engine stop, the method 100 proceeds from step 104 to step 108. At step 108 the control module 36 determines if the engine 12 has been restarted. If the engine has not been restarted, the method 100 proceeds to step 110. If the engine 12 has been restarted, the method proceeds to step 112 where an engine timer is set to a zero value. The engine timer is the time since the engine 12 has been restarted. The method 100 then proceeds to step 110.

At step 110 determines whether to override the commanded shift such that a minimum number of clutch/brakes 34 are engaged. If the override of the commanded shift is not performed, the method 100 ends. If the override is performed, the method proceeds to step 114.

At step 114, the control module 36 calculates a time threshold for holding the minimum number of clutches/brakes override based on a power request from a driver to the powertrain, for example using the accelerator pedal position. The accelerator pedal position is communicated to the control module 36 via the sensor 37C. A low power request (for example, a low application of the accelerator pedal) indicates less time in the override state. A high power request (for example, a higher application of the accelerator pedal) indicates more time in the override state. At step 116 the control module 36 compares the calculated time threshold to a time since the engine 12 has restarted. If the time since the engine 12 has been running exceeds the threshold, the method proceeds to step 118 and the commanded shift override is disabled and the method 100 ends. If the time since the engine 12 has been running does not exceed the threshold, the method proceeds to step 120.

At step 120 the control module 36 determines whether the transmission 14 has shifted to a higher gear. If the transmission 14 has shifted to a higher gear, the method proceeds to step 118. If the transmission 14 has not yet shifted to a higher gear, the method 100 proceeds to step 122 where the commanded shift is overridden such that a minimum of the clutches 34 required for a first forward gear will be engaged during the automatic engine restart.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for controlling a powertrain in a motor vehicle, the powertrain having an engine and a transmission with an accumulator and a plurality of torque transmitting devices operable to provide at least a plurality of gear speeds, the method comprising:
   determining a vehicle status;
   discharging the accumulator based on the vehicle status;
   commanding the transmission to provide a gear speed of the plurality of gear speeds;
   engaging only one of a first and a second torque transmitting device of the plurality of torque transmitting devices required to provide the commanded gear speed;
   starting the engine;
   setting an engine timer to a zero value
   incrementing the engine timer;
   calculating a time threshold based on a requested power demand to the powertrain;
   engaging both the first and the second torque transmitting devices to provide the commanded gear speed if the engine timer is greater than the time threshold; and
   engaging both the first and the second torque transmitting devices to provide the commanded gear speed if a second, higher gear speed than the commanded gear speed has been subsequently commanded.

2. The method of claim 1 further comprising the step of sensing a position of an accelerator pedal, and wherein the requested power demand is a function of the sensed position of the accelerator pedal.

3. The method of claim 2 wherein a first range of sensed accelerator pedal positions corresponds to a lower power demand to the powertrain and a second range of sensed accelerator pedal positions corresponds to a higher power demand to the powertrain than the lower power demand.

4. The method of claim 3 wherein the first range of the accelerator pedal positions corresponds to less depression of the accelerator pedal than the second range of the accelerator pedal positions.

5. The method of claim 1 wherein the engine timer is set to the zero value immediately after starting the engine.

6. The method of claim 1 wherein the step of determining the vehicle status includes determining whether an ignition of the motor vehicle is in an on and the step of discharging the accumulator includes discharging the accumulator if the engine has been requested to start and the ignition is in the on position.

7. The method of claim 1 wherein the step of determining the vehicle status includes sensing a wheel speed, sensing an engine output speed and sensing whether a brake pedal of the motor vehicle is depressed and the step of discharging the accumulator includes discharging the accumulator if the engine output speed is less than an engine output speed threshold, the wheel speed is less than a wheel speed threshold, and the brake pedal has been depressed for a predefined time period.

8. A powertrain comprising:
   a transmission having an accumulator and a plurality of torque transmitting devices;
   an engine;
   an accelerator pedal;
   an accelerator pedal position sensor for sensing a position of the accelerator pedal;
   a control module in communication with the transmission, the engine, and the accelerator pedal position sensor, the control module having memory for storing and executing a plurality of control logic, the plurality of control logic including:
   a first control logic for automatically stopping the engine;
   a second control logic for restarting the engine; and
   a third control logic for overriding the commanded shift by engaging a minimum number of the plurality of torque transmitting devices
   a fourth control logic for setting an engine timer to a zero value immediately after engine restart;
   a fifth control logic for incrementing the engine timer;
   a sixth control logic for calculating a time threshold for holding the minimum number of torque transmitting device override based on the sensed position of the accelerator pedal, wherein a low application of the accelerator pedal indicates a lower gear will be used and a high application of the accelerator pedal indicates a higher gear will be used;

a seventh control logic for disabling the minimum number of torque transmitting device override if the engine timer is greater than the time threshold; and an eighth control logic for disabling the minimum number of torque transmitting device override if the engine timer does not exceed the threshold and if the transmission has commanded a shift to a higher gear.

9. The powertrain of claim 8 wherein the first control logic includes automatically stopping the engine when an ignition is in an on position.

10. The powertrain of claim 8 wherein the first forward gear is one of a plurality of forward gears and wherein the first forward gear has the largest gear ratio of the plurality of forward gears.

11. The powertrain of claim 8 wherein the engine timer is the time since the engine has been restarted.

12. The method of claim 8 wherein the low application of the accelerator pedal corresponds to less depression of the accelerator pedal than the high application of the accelerator pedal.

13. The method of claim 8 wherein the time threshold is based on a power demand requested from a driver of the motor vehicle to the transmission.

14. The method of claim 8 wherein the minimum number of the plurality of torque transmitting devices is the minimum number of torque transmitting devices to enable the transmission to transmit torque.

15. A powertrain comprising:
   a transmission having an accumulator, a first torque transmitting device, and a second torque transmitting device;
   an engine;
   an accelerator pedal;
   an accelerator pedal position sensor for sensing a position of the accelerator pedal;
   a control module in communication with the transmission, the engine, and the accelerator pedal position sensor, the control module having memory for storing and executing a plurality of control logic, the plurality of control logic including:
   a first control logic for automatically stopping the engine;
   a second control logic for commanding a shift by engaging the first and the second torque transmitting devices;
   a third control logic for restarting the engine; and
   a fourth control logic for overriding the commanded shift by engaging only one of the first and second torque transmitting devices if the commanded shift is at least a first forward gear or a reverse gear.

* * * * *